(12) United States Patent
Wasson

(10) Patent No.: US 9,027,601 B2
(45) Date of Patent: May 12, 2015

(54) HYDRAULICALLY INSTALLED TUBE PLUG, TUBE PLUG INSTALLATION TOOLING, AND INSTALLATION SYSTEM AND METHOD

(75) Inventor: Russell D. Wasson, Bourbon, MO (US)

(73) Assignee: HydroPro, Inc., Bourbon, MO (US)

( * ) Notice: Subject to any disclaimer, the term of this patent is extended or adjusted under 35 U.S.C. 154(b) by 769 days.

(21) Appl. No.: 13/134,189

(22) Filed: Jun. 1, 2011

(65) Prior Publication Data

US 2011/0297264 A1    Dec. 8, 2011

Related U.S. Application Data

(60) Provisional application No. 61/396,978, filed on Jun. 4, 2010.

(51) Int. Cl.
*F16L 55/10* (2006.01)
*F16L 55/13* (2006.01)

(52) U.S. Cl.
CPC ...................... *F16L 55/13* (2013.01)

(58) Field of Classification Search
CPC . B21D 39/203; B21D 26/045; F16L 55/1286; B21C 37/294
USPC ............ 72/58, 62, 370.22, 370.24, 370.8, 61; 138/89, 90; 73/49.8
See application file for complete search history.

(56) References Cited

U.S. PATENT DOCUMENTS

| | | | | |
|---|---|---|---|---|
| 4,387,507 A | * | 6/1983 | Kelly | 29/727 |
| 4,418,556 A | * | 12/1983 | Galle et al. | 72/62 |
| 4,485,847 A | * | 12/1984 | Wentzell | 138/89 |
| 5,657,096 A | * | 8/1997 | Lukacs | 348/585 |
| 5,901,594 A | | 5/1999 | Wasson et al. | |
| 5,907,965 A | * | 6/1999 | Krausser | 72/58 |
| 6,601,437 B2 | * | 8/2003 | Gotowik | 73/49.8 |

* cited by examiner

*Primary Examiner* — Kevin P Shaver
*Assistant Examiner* — Robert Nichols, II
(74) *Attorney, Agent, or Firm* — Paul M Denk

(57) ABSTRACT

A hydraulically installed tube plug with or without O.D surface enhancements and plug installation tooling, high pressure fluid system and method. The invention stops leaks in tubes with a plug that utilizes controlled high pressure fluid within the plug itself to radially expand the plug in place. Other plugs and plugging systems rely on mechanical methods for setting the plugs in the tubes with little or no control on the radial pressure applied to the tube. This lack of radial pressure control can result in a tubesheet ligament being over stressed (plastically deformed) or not enough pressure applied to stop the leak. The plug high pressure expansion tooling is designed with built in safety components that allow high pressure hydraulic expansion methods to be used safely in blind holes. The high pressure fluid system's design allows it to be used in hazardous environments.

11 Claims, 4 Drawing Sheets

SECTION A-A

FIG. 3A  SECTION A-A

HYDRAULICALLY INSTALLED TUBE PLUG, TUBE PLUG INSTALLATION TOOLING, AND INSTALLATION SYSTEM AND METHOD

CROSS REFERENCE TO RELATED APPLICATION

This non-provisional patent application claims priority to the provisional patent application having Ser. No. 61/396,978, having filing date Jun. 4, 2010.

FIELD OF THE INVENTION

This invention relates to means for hydraulically installing a tube plug within transfer tubes that are found in boilers, condensers, and other type heat exchangers, and relates to plug installation techniques, and their system and method.

BACKGROUND OF THE INVENTION

The present invention relates generally to tube plugs and plug installation techniques and more particularly to thimble type plugs and the use of high pressure expansion mandrel plug installation tooling and technique to stop leaks in tubes found in boilers, condensers and other shell-and-tube type heat exchangers.

Some types of tube plugs used are tapered fiber (wooden or composite material) type plugs, one piece tapered metal plugs, two-piece metal tapered pin and collar plugs, multi-piece breakaway plugs, explosive plugs and thimble plugs. The tapered fiber plugs are usually limited to low pressure and temporary applications and in many cases are not compatible with the medium that would come in contact with the plug. Tapered metal one piece and two-piece (pin and collar) type plugs rely on mechanical methods for setting the plugs in the tubes with little or no control on the radial pressure applied to the tube. They are typically installed using a hammer type device. There is no way to reliably control and measure the radial force that these type plugs exert on the ID of the tube and the surrounding tubesheet ligaments during installation. This lack of radial pressure control can result in a tubesheet ligament being over stressed (plastically deformed) or not enough pressure applied to stop the leak. These forces can vary greatly from plug to plug even when installed by the same person using the same installation tools and techniques. One plug can be too loose and leak or even fall out, while the next plug can be too tight and cause permanent ligament damage which can generate leaks in the surrounding tube-to-tubesheet joints. Other potential problems with tapered metal plugs are described in Stanley Yokell's book "A Working Guide to Shell-and-Tube Heat Exchangers". It states Quote: "they create a crevice behind the contact surface between the plug and tube, which can lead to crevice corrosion; and the tensile stresses they generate in the tubesheet may sensitize it to stress corrosion cracking." A disadvantage of the two-piece tapered plug is that it requires a tight friction fit in three areas to work properly. One is between the tapered pin (inner piece) and the ring (outer piece), second is between the OD of the ring and the ID of the tube and last is the surface between the tube OD and the tubesheet hole. Another disadvantage is the outer ring needs to have an initial clearance gap between it and the tube ID for the plug to be inserted. This requires a substantial deformation of the ring to engage the tube ID with sufficient force to create the interfacial pressure needed to hold it in place and seal the leak. It is possible that because the shoulder of the ring rests against the tube end during installation that the driving force necessary to seat the plug and expand it may cause the tube itself to be dislodged from its seat and create another leak path. Multi-piece breakaway plugs have a very small effective expansion range and therefore must be precisely sized to work properly: A common problem is when an undersized plug is selected for use. During installation the breakaway plugs become rapidly work-hardened during the expansion process. The resistance and resulting friction forces will cause the breakaway of the plug parts to take place before the necessary radial forces are reached that should hold the plug in place and seal the leak. The results are plugs that may loosen and fail during the operation of the unit.

Explosive friction fit plugs must be installed by explosive certified personnel and cannot be used in many applications because of the hazardous environments that the vessels are located in such as chemical plants and refineries. Even if they can be used, it may require whole areas of the plant to be shut down and personnel removed from the area for safety reasons during their use. Another down side of explosive plugs is the extensive cleanup required to remove the explosive residue from the vessel to prevent plant systems contamination prior to bringing the vessel back online.

Thimble type plugs are typically a one piece plug that resembles a thin tube with a closed end or "blind hole." When installed using mechanical rollers the plug must fit snuggly in the tube hole to begin with to prevent it from spinning during the initial rolling process. In all of the applications discussed with the exception of explosive plugs it has been proven that when the ID of the tube hole being plugged is even slightly oval shaped it is difficult to get the plug OD to conform to the tube ID and provide a reliable sealing surface.

In the patent to Russell D. Wasson and David A Vossbrinck, U.S. Pat. No. 5,901,594, issued on May 11, 1999, for High Pressure Expansion Mandrel with Cams Engaging Oppositely Directed Ends of an Expandable Segmented Ring, there is disclosed a high pressure mandrel for joining a metal tube to a wall of a metal sheet surrounding an annular bore of the metal sheet. Spaced O-rings are disposed on a shaft of a mandrel that is disposed axially in the metal tube. Outboard of the O-rings, backup rings are respectively disposed on the shaft. Outboard of the backup rings are disposed segmented ring assemblies which are also disposed on the shaft. Facing opposite ends of each segmented ring assemblies are cam rings. The cam rings are disposed on the shaft. High pressure fluid by means of a conduit in the mandrel shaft provides pressure to the inner wall of the metal tube to expand the tube radially outward. Simultaneously, the high pressure fluid urges the O-rings outward toward the associated backup rings and in turn the backup rings are urged outwardly toward the associated segmented ring assemblies, respectively. Facing each of the segmented ring assemblies are cam rings. Each set of cam rings expand radially its associated segmented ring assembly in response to the high pressure fluid.

SUMMARY OF THE INVENTION

This invention contemplates the construction of a precision hollow metal plug, and its method of installation within the tube of a high pressure boiler, condenser, or other heat exchangers, in order to close off a particular tube which due to corrosive or other effects, may be subject to leaking. The precision hollow metal plug of this invention is made with a smooth blind hole formed internally, and on its external surface, incorporates a series of concentric ridges and grooves which in combination with its plug, is inserted into the tube to be plugged. A mandrel assembly with seals on both ends, and an internal passage to allow high pressure fluid, such as water or oil, to pass through it, is inserted into the plug. High pressure fluid from a pumping system is injected through the mandrel and into the area between the mandrel and its seals. The pressurized fluid, which may be subject to pressures in arrange of 20,000 psi to 60,000 psi is conducted to and is contained between the seals, and is biased against the internal surface of the plug, which forces the plug to expand radially under such pressures and causes the outer surface of the plug to come in contact with the inner surface of the tube, to create a fluidic seal. When the high pressure fluid used to expand the plug into place is relieved, by venting, it leaves a tight interfacial fit between the OD of the tube plug, and the ID of the tube that is being sealed.

It is, therefore, the principal object of this invention to provide a plug, having unique characteristics that provides for its pressure fitting against various tubes found in boilers and condensers, and which can be plugged in place through the application of very high psi to form a seal for a tube that is experiencing leakage, fracture, or other deterioration.

Another object of the present invention is an engineered thimble type tube plug made of but not limited to the following materials: high strength steel, stainless steel, brass, titanium, and other highly engineered composite materials, that can be expanded using high pressure hydro-expansion tooling and techniques.

Another feature of the present invention is a variation of a thimble type tube plug with a shoulder or collar that is an integral part of the plug OD used to seat the plug at the very end of a tube or annular bore in a metal sheet i.e. tube-sheet and expanded in place using high pressure hydro-expansion tooling and techniques.

A feature of the present invention is a variation of a thimble type tube plug with a consistent OD that will allow the plug to be positioned anywhere along the interior length of a tube or annular bore in a metal sheet i.e. tube-sheet and expanded in place using high pressure hydro-expansion tooling and techniques.

A feature of the present invention is a variation of a thimble type tube plug with concentric ridges as an integral part of the plug OD. These ridges facilitate the plugs ability to penetrate thin layers of scale and bite into the ID of the bore or tube surface that the plug is being expanded into and provide a more complete seal.

Another object of the present invention is a high pressure expansion mandrel assembly for hydro-expansion of thimble type tube plug that utilizes a pressurized medium such as but not limited to distilled water. This high pressure medium the expansion mandrel uses is supplied by an adjustable high pressure supply system that produces variable and controllable pressures between 20,000 psi and 60,000 psi. These high pressure supply systems may be engineered to utilize pneumatic controlled logic or electronic and digital control logic or a combination of both.

A feature of the present invention is a high press expansion mandrel that incorporates an axial passageway in the body of the mandrel that provides for a safe relief of pressure when the mandrel assembly is used in blind holes such as a thimble type tube plug. This passage normally acts as a vent hole when inserting or extracting the mandrel and prevents a hydraulic lock from taking place in the blind hole area behind the mandrel. Under conditions that might cause an undesirable buildup of high pressure in the blind-hole area behind the mandrel assembly, this passageway acts as an overpressure safety vent and prevents the area from pressurizing.

Another object of the present invention is a high pressure expansion mandrel that has a short raised step at one end that acts as a stop and retains various sliding parts on the mandrel when the parts are under an axial force. The opposite end of the mandrel is threaded to accept a nut that when engaged, acts to stop and retain various sliding parts on the mandrel when the parts are under an axial force in the opposite direction.

A feature of the present invention is a high pressure expansion mandrel that incorporates a cam surface as an integral part of the short raised step on the end of the mandrel shaft body. This integrated cam surface mates up with one side of a segmented ring assembly disposed on the mandrel shaft and works with a sliding cam ring disposed on the same mandrel shaft on the opposite side of the same segmented ring assembly. In response to high pressure being applied to the sliding cam ring, pressure is applied to the sliding segmented ring which moves in an axial direction up against the fixed integral cam surface. The forces created by the opposing cam surfaces act on the segmented ring assembly cause it to expand radially, until it comes in contact with the plug or tube inner surface. The resulting forces facilitate centering and maintaining alignment of the mandrel assembly in the axial bore.

Another feature of the present invention is a high pressure expansion mandrel which incorporates removable center land area (spacer) to facilitate removal and replacement of worn parts on the mandrel from the primary (threaded end) of the mandrel shaft. This spacer when in place helps locate and position the sealing components of the expansion mandrel assembly which define the expansion zone area.

Another object of the present invention is a high pressure fluid supply system to provide fluid under high pressure to hydraulically radially expand tubes and thimble type tube plugs.

Another feature of the present invention is a high pressure fluid supply system that is portable and able to operate in hazardous environments using only a supply of compressed air to both control and power its pumping system.

A further benefit of this invention is the use of a mandrel that has an inward threaded end, that may be secured in threaded engagement with a previously installed plug, to facilitate the removal of a plug when further servicing or tube replacement may be required.

These and other objects may become more apparent to those skilled in the art upon review of the summary of the invention as provided herein, and upon undertaking a study of the description of its preferred embodiments, in view of the drawings.

DESCRIPTION OF THE DRAWINGS

FIG. 3 is a side view of the high pressure expansion mandrel located within a tube plug as shown in FIG. 1, with all shown being inserted into a tube located one of the tubes found in boilers, condensers, and the like;

FIG. 3A is a sectional view of the high pressure expansion mandrel, as located in a tube plug, and shown within the tube being plugged, taken along the line A-A of FIG. 3.

DESCRIPTION OF THE PREFERRED EMBODIMENT

Figure 1:
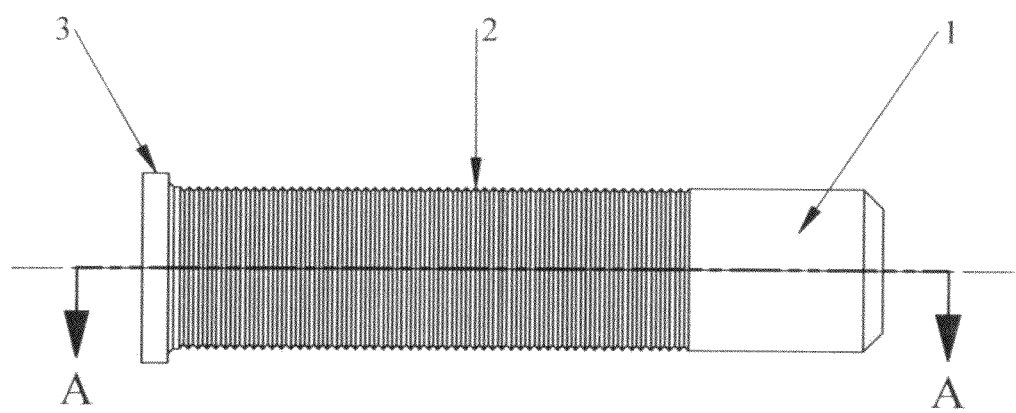
FIG. 1 is a front elevational view of the tube plug of this invention embodying the principles of this invention.
Figure 1A:
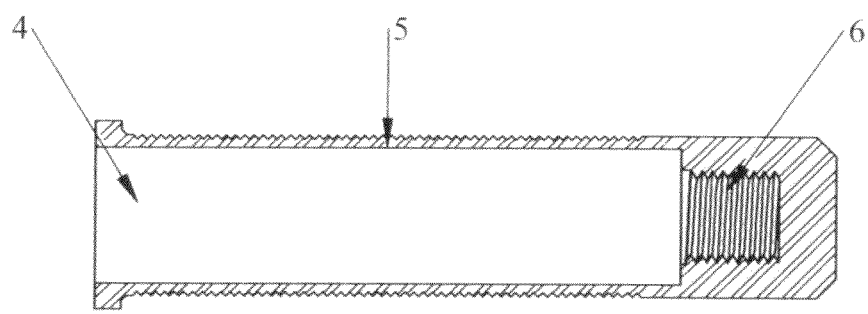
FIG. 1A is an axial section view of the tube plug taken upon the line A-A of FIG. 1.

In referring to the drawings; and in particular to FIG. 1, the tube plug 1 is a cylindrical housing member that can be made of but not limited to the following materials: high strength steel, stainless steel, brass, titanium, and other highly engineered composite materials, that can be expanded using high pressure hydro-expansion tooling and techniques. It is sized for insertion within the end portion of a tube or an annular bore in a metal sheet i.e. tube-sheet, for a boiler, condenser, and other type heat exchanger. A portion of the outer surface of the plug 1 may or may not have concentric ridges and grooves 2 to grip the inside of the tube and create a seal, and may or may not have a flange 3 located at one end to control the depth of plug insertion into the tube. The plug 1 has an axial blind bore 4 comprising a smooth portion 5 which may or may not communicate with smaller diameter threaded portion 6. This threaded portion 6 when included is used for attaching various plug extraction tools (not shown) and can be used for attaching internal plug support structures (not shown) in various versions of the plug.

Figure 2:
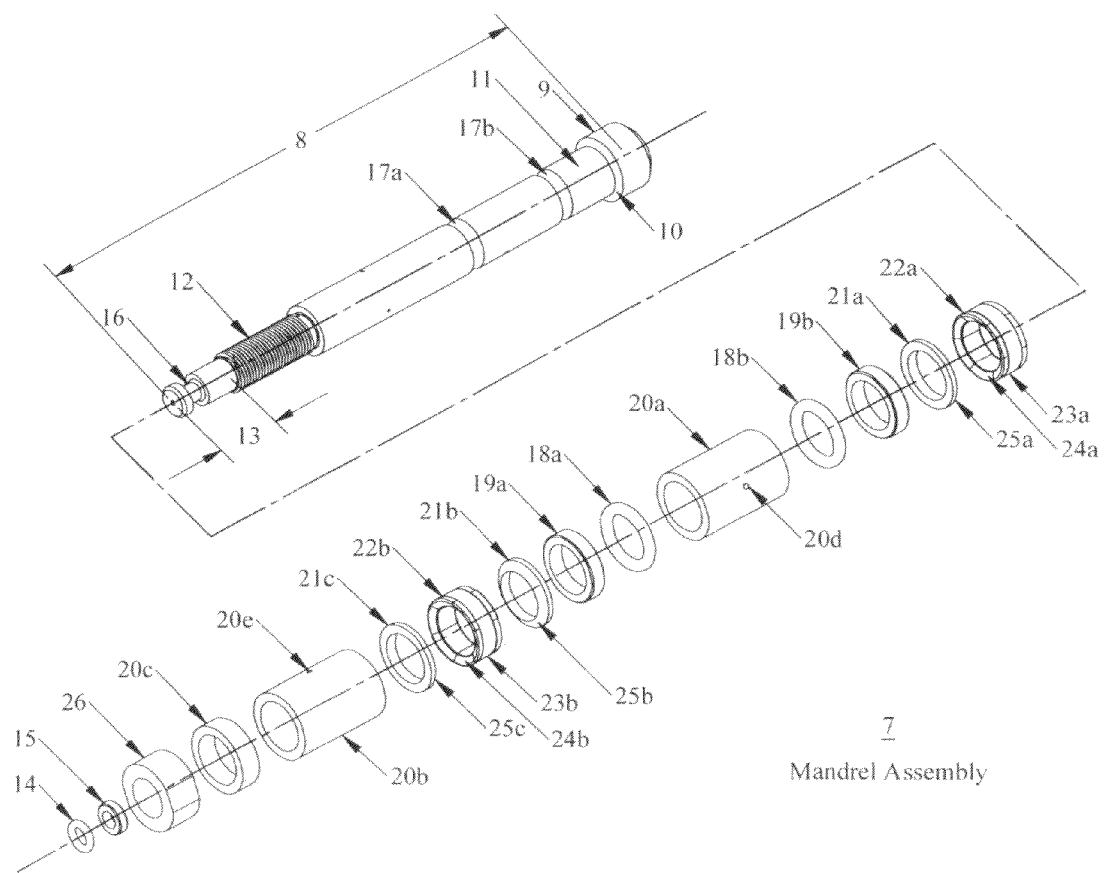
FIG. 2 is an exploded view of the high pressure expansion mandrel embodying and showing the variety of component parts of this present invention.

Now referring to FIG. 2. The hydraulic expansion apparatus for setting the tube plug 1 in place includes a mandrel assembly 7 made up of the following components. The components are made of appropriate high strength materials such as but not limited to, steel, stainless steel, titanium, high strength metal alloys, plastic ceramics and can vary depending on the application and any special environmental needs. A mandrel shaft 8 made of an appropriate high strength material and has an increased diameter section 9 at one end which has a beveled surface 10 on the inboard side where it joins with the reduced diameter portion of the shaft 11 and a threaded section 12 at the opposite end of the shaft. It should be noted that the mandrel 8 is generally formed of a uniformed diameter along it length except for its end 9, so that the components mounted thereon can be slid off and replaced when required.

Outboard of the threaded section 12 is a suitable high pressure connector 13 capable of joining the shaft to a 20,000 psi to 60,000 psi variable pressure fluid supply in the operation of the mandrel assembly 7 for the expansion of the tube plug 1. O-ring 14 and a polyurethane backup ring 15 sit in a recess 16 formed in the shaft 8 outboard of the threaded section 12 of the shaft 8. Suitable annular grooves 17a and 17b are formed in the reduced section of the shaft 11. Seated in the grooves 17a and 17b respectively are O-rings 18a and 18b made of a suitably soft material. Outboard and adjacent to O-rings 18a and 18b are polyurethane backup rings 19a and 19b made of a resilient composition that are considerably harder than the O-rings 18a and 18b but will deform in a plastic manner when placed under extremely high pressure. These backup rings 19a and 19b are of a slightly larger diameter than the increased diameter section 9 on the mandrel shaft 8 to better enable them to fill the annular extrusion or expansion gap for the mandrel assembly 7 as defined by the outer surface of the increased diameter section 9 on the mandrel shaft 8 and the inner wall of the tube plug 5. The backup rings 19a and 19b tend to prevent destructive deformation to the O-rings 18a and 18b, respectively by acting as a barrier between the O-rings 18a and 18b and other components disposed on the mandrel shaft 8 outboard of the backup rings 19a and 19b.

A spacer 20a made of an appropriate high strength material with an ID slightly larger than the OD of the reduced diameter section 11 of the mandrel shaft 8 to allow it to slide freely in an axial direction on the mandrel shaft 8. Spacer 20a has a small diameter cross bore 20d to facilitate the free flow of pressurized fluid through and around the spacer. This allows for the removal of the pressure spacer 20a from the mandrel shaft 8 which facilitates the installation and removal of various components that are disposed on the mandrel shaft 8 between the groove 17b location and the increased diameter section 9 of the shaft. The OD of the pressure spacer 20a should be slightly less than the increased diameter section 9 of the mandrel shaft 8. The spacer 20a is disposed on the mandrel shaft 8 between grooves 17a and 17b to provide separation for O-rings 18a and 18b and to assist them in maintaining their desired position in the grooves 17a and 17b when inserting and removing the mandrel assembly 7 axially in and out of the tube plug 1.

Outboard of the backup rings 19a and 19b are segmented ring assemblies 22a and 22b. The segmented ring assemblies 22a and 22b, comprise, respectively four to eight equal sized segments, more or less, made of a high strength steel alloy and held together by elastic bands or O-rings 23a and 23b. The number of segment pieces for each ring assembly is dependent on the size of the application. The elastic bands or O-rings 23a and 23b rest in grooves formed respectively in the outer annular face of the segment pieces that form the segmented rings 22a and 22b. The ID of the segmented ring assemblies 22a and 22b is a diameter that allows them to slide along the reduced section 11 of the mandrel shaft 8. The OD of the segmented assemblies 22a and 22b should be slightly less than the increased diameter section 9 of the mandrel shaft 8. On each side of the segmented ring assemblies 22a and 22b are oppositely directed beveled cam surfaces 24a and 24b.

Cam rings 21a, 21b, and 21c are annular members that are made of a an appropriate high strength material with an ID that allows them to slide freely on the reduced diameter section 11 of the mandrel shaft 8 and an OD slightly less than the increased diameter section 9 of the mandrel shaft 8. Each cam ring 21a, 21b and 21c has one end face thereof that is perpendicular to the axis of the mandrel shaft 8. Each cam ring 21a, 21b and 21c has an opposite beveled end face 25a, 25b and 25c respectively. The cam rings 21a, 21b and 21c are disposed on the mandrel shaft 8 with one inboard of the segmented ring assembly 22a and one inboard and outboard of the segmented ring assembly 22b with their beveled end facing its associated segmented ring assembly, conforming to or matching the beveled surface confronting therewith.

Outboard of cam ring 21c are disposed annular spacers 20b and 20c made of an appropriate high strength material with an ID slightly larger than the OD of the reduced diameter section of the mandrel shaft 11 to allow it to slide freely in an axial direction on the mandrel shaft 8. The OD of the spacers 20b and 20c should be slightly less than the increased diameter section 9 of the mandrel shaft 8. Spacer 20b has a small diameter cross bore 20e to facilitate the free flow of venting fluid through and around the spacer. The spacers assist in positioning the components on the mandrel shaft 8 between groove 17a and the threaded section 12 of the mandrel shaft 8. Outboard of the spacer 20c is a locking nut 26 that is secured in threaded engagement with the threaded section 12 of the mandrel shaft 8 and limits the axial travel of the components on the mandrel shaft 8 in the direction of the locking nut 26.

Figure 3:
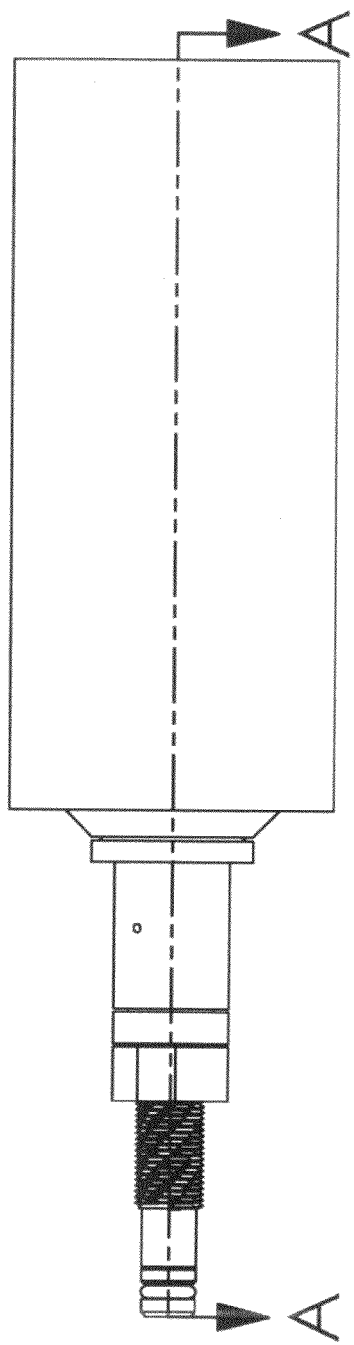
Figure 3:
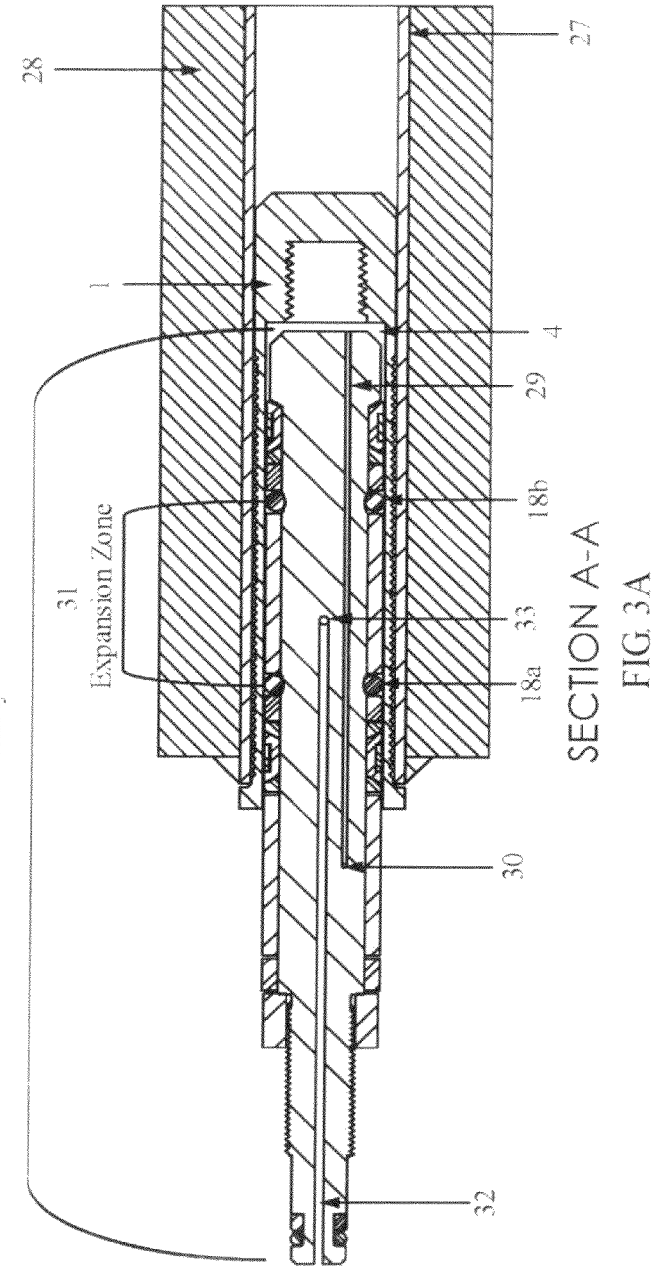

Now referring to FIGS. 1, 2 and 3. The tube plug 1 is inserted axially into a tube 27 which is disposed in a bore of a metal sheet 28 i.e. a tube sheet. The high pressure expansion mandrel assembly 7 is inserted axially into the blind hole bore 4 of the tube plug 1. As the mandrel assembly 7 enters the tube plug 1, the O-ring 18b seals against the smooth bore 5 of the tube plug 1. Air or liquid that may be trapped between this sealing point in the blind hole area 4 of the tube plug 1 is vented through an axial bore or vent passage 29 in the mandrel shaft 8 which intercepts a cross bore 30 located out board of O-ring 18a and the opposite end of the expansion zone 31. The expansion zone 31 is defined as the area between the sealing points of O-rings 18a and 18b. This venting action prevents a hydraulic lock condition from taking place when inserting or removing the mandrel assembly 7 into or from a blind bore such as the one in a tube plug 1. A suitable fluid such as but not limited to distilled water from a high pressure pump system capable of supplying fluid at variable and controllable pressures between 20,000 pi and 60,000 psi is supplied via a suitable umbilical connection, is injected into the plug 1. These high pressure supply systems may be engineered to utilize pneumatic controlled logic or electronic and digital control logic or a combination of both. The fluid enters the mandrel shaft 7 via an axial bore 32 in the center of the mandrel shaft 7 which terminates at the intersection of a cross-bore 33 in the expansion zone 31 area which is located between O-rings 18a and 18b. The fluid under pressure is contained in the annular extrusion or expansion gap in the expansion zone 31 located axially between O-rings 18a and 18b on the mandrel assembly 7. The contained pressurized fluid pushes the O-rings 18a and 18b and causes them to leave the grooves 17a and 17b respectively and slide along the mandrel shaft 8 in an axial direction outward. The O-rings 18a and 18b come in contact with the backup rings 19a and 19b respectively and cause them to slide in an axial direction outward on the mandrel shaft 8. As the backup rings 19a and 19b come in contact with the cam rings 21a and 21b they move them in an axial direction outward and into contact with the segmented rings 23a and 23b respectively. The segmented ring 23a is moved further outward in an axial direction until it comes in contact with the beveled surface 10 of the increased diameter section 9 of the mandrel shaft 8. Concurrently the segmented ring 22b is moved in an axial direction outward and as it comes in contact with the cam ring 21c it moves cam ring 21c in an axial direction outward until cam ring 21c comes in contact with spacer 20b. As the fluid pressure increases the axial movement of the components cause the beveled surfaces 25a, 25b, and 25c of cam rings 21a, 21b, and 21c respectively along with the beveled surface 10 of the mandrel shaft 8 to engage with the oppositely directed conforming walls of the segmented rings 22a and 22b respectively. This action causes the segmented ring assemblies 22a and 22b to expand radially during the radial expansion of the extrusion gap which is taking place concurrently under the force of the high pressure fluid. As the segmented rings 22a and 22b expand radially they remain in contact and parallel to the axis of the tube plug 1 and form a barrier to prevent the softer material of the backup rings 19a and 19b from extruding in an axial direction outward. As the high pressure fluid continues to enter the annular gap in the expansion zone 31 through the port 33, it expands the tube plug 1 radially. As pressure increases the plug 1 goes into plastic deformation until it makes contact with the interior of tube 27. Additional pressure stresses the tube 27 and tube sheet ligament 28 but always within the ligaments elastic range. As the plug wall expands, the ridges 2 on the plug 1 O.D penetrate the inner wall of the tube 27 slightly, interlocking with the tube 27 and thereby creating multiple interlocking sealing rings between the tube plug 1 and the tube 27. When pressure is released the tubesheet 28 material returns to its original shape and position and the result is a tight interfacial fit between the O.D. of the tube plug 1 and the I.D. of the tube 27.

Figure 4:
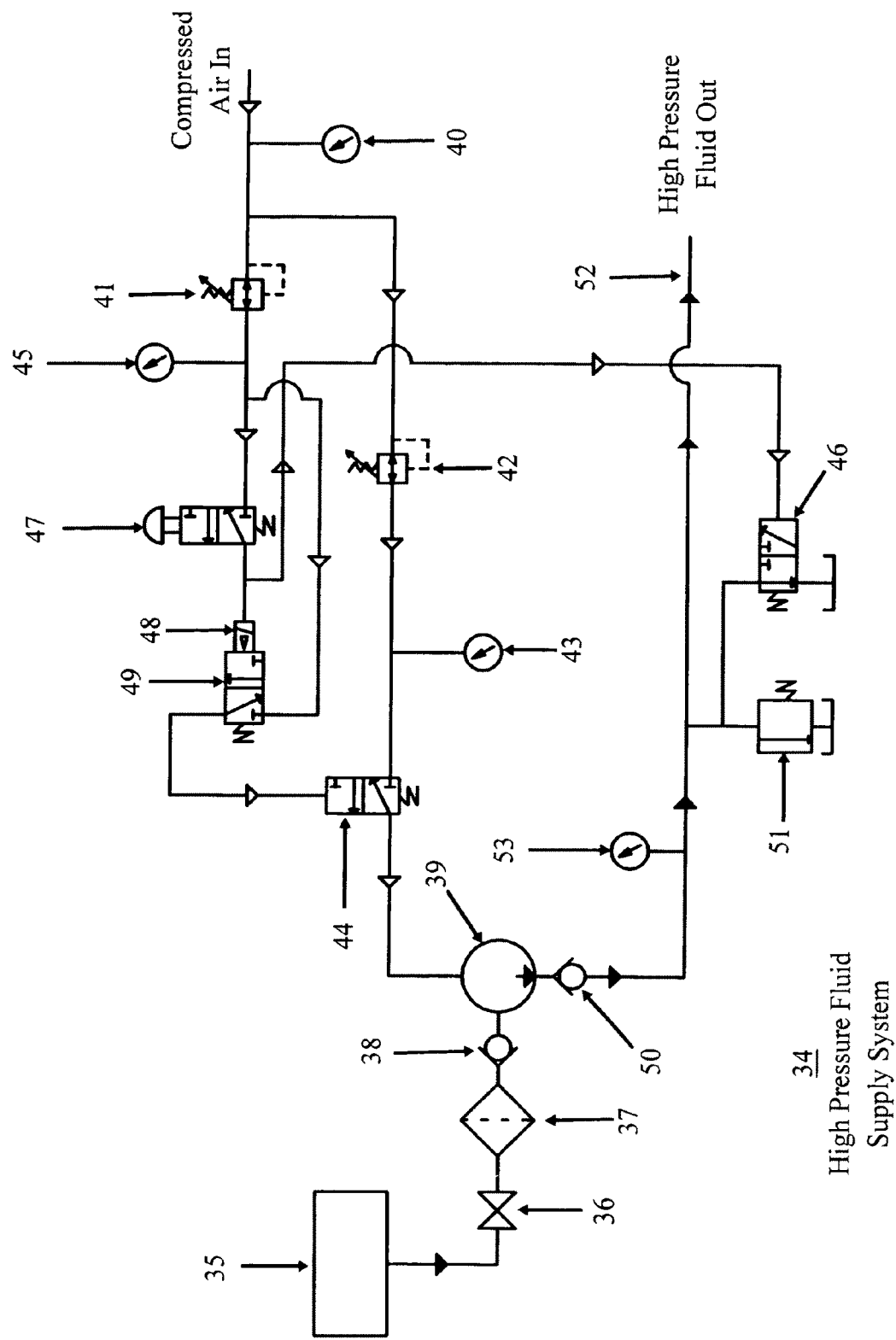
FIG. 4 is a schematic view of the high pressure fluid supply system showing the relationship of the various components of the present invention.

Now referring to FIG. 4 which is a schematic of a high pressure fluid supply system 34 showing the relationship of the components used to generate and control the fluid used to expand the tube plug in FIG. 1. Fluid is taken from a reservoir 35 and supplied through a shutoff valve 36, particulate filter 37, and one-way check valve 38 to an air-over-hydraulic pump 39. Low pressure compressed air between 80 psi and 160 psi is supplied to the unit as read on inlet air pressure gauge 40. This air is supplied to two regulators 41 and 42. Regulated pressure from one regulator 42 is indicated by pressure gauge 43 as the air is routed to a normally closed air pilot valve 44. The regulator 42 will govern the maximum available output pressure of the hydraulic pump 39 by controlling the inlet air pressure. Air pressure from the second regulator 41 is indicated on a pressure gauge 45 as it is supplied to a normally open air pilot valve 46 and to a manually operated 3-way air valve 47. The system is activated when the operator selects the open position of air valve 47 and thus supplies regulated air to the normally open air pilot valve 46 closing it and to an air pilot operator 48. Air pilot operator 48 activates a normally closed air valve 49 which in turn opens and directs regulated air to activate a normally closed air pilot valve 44. The air pilot valve 44 opens and directs regulated air to the air side of the hydraulic pump 39 causing the pump 39 to operate. The hydraulic pump 39 begins to pump fluid past the outlet check valve 50 to the manual relief valve 51 and the high pressure out conduit 52. When the manual relief valve 51 is closed and the high pressure out conduit 52 is restricted, system output pressure will increase and will be indicated on the output pressure gauge 53. When the operator closes the 3-way air valve 47 the pressurized air to the air pilot valve 46 and the air pilot operator 48 is terminated. This causes the air valve 49 and air pilot valve 44 to return to their normally closed positions which shuts off the supply of pressurized air to hydraulic pump 39 which causes the hydraulic pump 39 to cease cycling. With the pressurized air removed from air pilot valve 46, it returns to the open position and relieves the pressure trapped in the high pressure out conduit 52 and returns the fluid to the reservoir 35.

Variations or modifications to the subject matter of this invention may occur to those skilled in the art upon review of the invention described herein. Such variations, if within the spirit of this invention, are intended to be encompassed within the scope of any claims to patent protection issuing hereon. The specific description of the invention as set forth in the specification, and as depicted in the drawings, are set forth for illustrative purposes only.

The invention claimed is:

1. A high pressure mandrel assembly for fluidic sealing of a tube plug within the wall of a tube for a tubular vessel including but not limited to heat exchangers, condensers, evaporators, boilers, and heaters, said mandrel incorporating various components that define an expansion area subject to high pressure fluid for use for expanding the tube plug and biasing it against and sealing the tube of a tubular vessel, said components of said mandrel including a shaft, said shaft having an inner end with an increased diameter section located within the tube plug during usage, said mandrel at its opposite end is located exteriorly of the tube plug and has a threaded segment, a nut provided for being accommodated upon said threaded segment of said mandrel shaft, the remainder of said mandrel shaft between said threaded segment and the increased diameter section at its inner end with the exception of a pair of grooves being of substantially uniform diameter throughout its length and being of a lesser diameter than the increased diameter section at the inner end of said mandrel, a bore provided within said mandrel and extending partially along its length for opening into the expansion area of the mandrel assembly, and a vent passage separately provided within said mandrel, and extending from its inwardmost end to that part of the mandrel maintained externally of the tube plug in which it inserts, so that pressure forwardly of the mandrel assembly as it is located within and is pulled from the tube plug may be vented so as to release any pressure or suction that may be generated thereat during its application and removal;

a spacer provided, located upon said mandrel in its expansion area and at the location where expansion of the tube plug is to be attained, a pair of sealing o-rings provided to either side of the spacer, provided upon the mandrel, and for furnishing of a sealing of the space between the spacer and the tube plug when substantial fluid pressure is applied thereat to force said plug into an expanded sealing engagement within the tube plug, each o-ring fitting within one of said pair of grooves provided upon said mandrel shaft;

a pair of backup rings, one of each backup ring being applied adjacent to one of each o-ring upon the mandrel shaft, each backup ring having a diameter larger than the increased diameter section upon the inner end of the mandrel shaft, to provide a sealing engagement with the interior of the tube plug when the mandrel assembly is installed therein;

cam means, one provided adjacent the said backup rings; and said increased diameter section of the mandrel forming a front shoulder, a segmented ring biasing against said mandrel front shoulder, and one of said cam means biasing against said segmented ring during insertion and usage of the expanding mandrel assembly.

2. The expanding mandrel assembly of claim 1 wherein each cam means includes a pair of cam rings, a segmented ring assembly provided between each pair of cam rings, each segmented ring assembly comprising a series of segmented pieces, elastic bands surrounding each series of segmented pieces, such that when pressure is applied upon the expanding mandrel assembly, the cam rings are forced into engagement with their respective segmented ring assembly, to force it to expand and contact the inner surface of the tube plug to center and fix the expanding mandrel assembly in place during the application of hydraulic pressure when sealing the tube plug interiorly of a tube.

3. The expanding mandrel assembly of claim 2 and including one or more additional spacers provided upon the mandrel assembly, and a nut fastening onto the shaft threads, to retain the various mandrel assembly components upon said mandrel during its assembly.

4. The expanding mandrel assembly of claim 3 and wherein said spacer between the o-rings and located within the expansion area of the mandrel shaft has at least one port provided therethrough to facilitate the free flow and passage of the pressurized hydraulic fluid to enter into the space between said spacer, and the interior of the tube plug, during its usage.

5. The expanding mandrel assembly of claim 4, wherein said o-rings adjacent the spacer of the expansion area fit within said grooves provided around the circumference of the mandrel shaft, to conveniently seat the o-rings into position for sealing the spacer of the expansion area relative to said mandrel shaft.

6. The expanding mandrel assembly of claim 2 wherein said cam mean rings provides a bevel provided upon said increased diameter section of said shaft.

7. The expanding mandrel assembly of claim 1, wherein due to the uniformed diameter of the shaft along its length, the various mandrel assembly components may be removed from the shaft to provide for one of cleaning, repairing, and replacing of components upon said mandrel shaft.

8. The expanding mandrel assembly of claim 1 and including a high pressure fluid power supply, said power supply capable of delivering high fluid pressure to the conduit provided through the mandrel shaft when furnishing significant pressure to the expansion area while acting upon the tube plug and provide for its expansion and sealing within the tubes of a tubular vessel.

9. The high pressure fluid power supply of claim 8, wherein the high pressure generated and delivered to the expanding mandrel assembly varies between 20,000 psi and 60,000 psi.

10. The expanding mandrel assembly of claim 9 wherein the high pressure is furnished from a medium comprising such as but not limited to water.

11. The expanding mandrel assembly of claim 10 wherein said high pressure generated in the mandrel assembly comprising one of a pneumatically and hydraulically controlled and operated power supply that allows for its usage in designated hazardous environments.

\* \* \* \* \*